US009342664B2

(12) United States Patent
Bas Bayod et al.

(10) Patent No.: US 9,342,664 B2
(45) Date of Patent: May 17, 2016

(54) METHOD TO MAKE PAYMENT OR CHARGE SAFE TRANSACTIONS USING PROGRAMMABLE MOBILE TELEPHONES

(75) Inventors: José Ignacio Bas Bayod, Zaragoza (ES);
Francisco Bas Bayod, Zaragoza (ES);
Fernando Bas Bayod, Zaragoza (ES)

(73) Assignee: ETRANS L.C., Miami, FL (US)

( * ) Notice: Subject to any disclaimer, the term of this patent is extended or adjusted under 35 U.S.C. 154(b) by 494 days.

(21) Appl. No.: 13/069,759

(22) Filed: Mar. 23, 2011

(65) Prior Publication Data

US 2011/0231319 A1    Sep. 22, 2011

Related U.S. Application Data

(63) Continuation of application No. 11/658,950, filed as application No. PCT/ES2005/070115 on Jan. 29, 2007, now abandoned.

(51) Int. Cl.
*G06F 21/00* (2013.01)
*G06F 21/10* (2013.01)
(Continued)

(52) U.S. Cl.
CPC ............. *G06F 21/10* (2013.01); *G06Q 20/10* (2013.01); *G06Q 20/32* (2013.01); *G06Q 20/325* (2013.01); *G06Q 20/3227* (2013.01); *G06Q 20/3255* (2013.01); *G06Q 20/3823* (2013.01); *G06Q 20/3829* (2013.01); *G06Q 20/425* (2013.01)

(58) Field of Classification Search
USPC ........................................................ 705/51
See application file for complete search history.

(56) References Cited

U.S. PATENT DOCUMENTS 4,578,530 A * 3/1986 Zeidler .................. G06Q 20/02
380/277
5,590,038 A    12/1996 Pitroda
(Continued)

FOREIGN PATENT DOCUMENTS

EP              0766852         8/2004
WO           WO95-35546        12/1995
(Continued)

OTHER PUBLICATIONS

Download Obopay onto your phone 9online) Obopay, Inc., 2007 (retrieved on Mar. 28, 2007) Retrieved from the Internet: <URL: https://www.obopay.com/consumer/GetHelp.do?target=HelpMobileAppPage>.
(Continued)

*Primary Examiner* — Zeshan Qayyum
(74) *Attorney, Agent, or Firm* — Gordon & Jacobson, P.C.

(57) ABSTRACT

A system, method and mobile application for conducting financial transactions wherein a mobile device operated by a user is operably coupled to a server over a mobile communication network. Both the server and the user's mobile device store a user encryption key (UEK) and a user access key (UAK). A software application stored on the user's mobile device and the server are configured to conduct a transaction wherein a session key (SK) specific to the transaction is exchanged in an encrypted form based upon the UEK. The software application is further configured to i) generate transaction data, ii) access the UAK stored on the mobile device, iii) encrypt the UAK and transaction data into an encrypted form based upon the SK, and iv) send the UAK and transaction data in encrypted form from the mobile device to the server over the mobile communication network in order to conduct the transaction.

12 Claims, 6 Drawing Sheets

(51) Int. Cl.
*G06Q 20/10* (2012.01)
*G06Q 20/32* (2012.01)
*G06Q 20/38* (2012.01)
*G06Q 20/42* (2012.01)

(56) References Cited

U.S. PATENT DOCUMENTS

| | | | |
|---|---|---|---|
| 5,884,271 A | 3/1999 | Pitroda | |
| 6,480,957 B1* | 11/2002 | Liao | H04L 9/3273 380/277 |
| 6,705,520 B1 | 3/2004 | Pitroda | |
| 6,769,607 B1 | 8/2004 | Pitroda | |
| 7,689,497 B2 | 3/2010 | May | |
| 7,720,742 B1 | 5/2010 | Mauro et al. | |
| 2001/0018660 A1 | 8/2001 | Sehr | |
| 2003/0051173 A1* | 3/2003 | Krueger | G06F 21/32 726/21 |
| 2004/0006710 A1* | 1/2004 | Pollutro | G06F 21/31 726/28 |
| 2004/0139320 A1* | 7/2004 | Shinohara | H04W 12/04 713/168 |
| 2005/0027543 A1 | 2/2005 | Labrou et al. | |
| 2008/0091614 A1 | 4/2008 | Bas Bayod et al. | |

FOREIGN PATENT DOCUMENTS

| | | |
|---|---|---|
| WO | WO00-31699 | 6/2000 |
| WO | WO02-41271 | 5/2002 |

OTHER PUBLICATIONS

Pay Bills, Top-up your mobile phones, Send/Receive money worldwide . . . Do all you shopping with CoralPay (online). CoralPay International, 2007 (retrieved on Mar. 28, 2007) Retrieved from the Internet: <URL:https://www.coralpay.com/how.html>.

C-sam, Inc. Mobile Solution for Money Transfer (online). C-Sam, Inc., 2006, (retrieved on Mar. 28, 2007) Retrieved from the Internet: <URL:https://www.c-sam.com/download/document/csam_moxfer.pdf>.

\* cited by examiner

METHOD TO MAKE PAYMENT OR CHARGE SAFE TRANSACTIONS USING PROGRAMMABLE MOBILE TELEPHONES

CROSS-REFERENCE TO RELATED APPLICATIONS

This application is a continuation application which claims priority from U.S. application Ser. No. 11/658,950, which is herein incorporated by reference in its entirety.

BACKGROUND OF THE INVENTION

The electronic payment is a method that has gained popularity throughout time. There are numerous well known systems that allow making this kind of payment.

At first, these systems were based completely on the traditional cable telephone communications and on magnetic band card readers placed in shops. But with the arrival of Internet and the mobile telephony, new methods of virtual payment have appeared. Specifically, there is a well known payment system by mobile telephone that is based in the association of a credit/debit card number with a PIN and a mobile telephone number in the transactions server. The procedure followed by the system is, basically, the authorisation of the operation by the user, once the transaction data is received in his mobile phone. The transaction is not completed until the user confirms it with his mobile phone, entering his secret PIN. The communication with the user, in order to authorise such transaction, is done via a data call from the transactions server, which will take control of the introduction of data with the keypad and the representation of the information on the telephone screen. When buying at the merchant's site, a specially configured POS is required, in order to pay with this system, because the transaction must start with a special call to a telephone number, call that is handled by the transactions server.

This system suffers from rigidity, due to the fact that the communication with the user is done via a data call, which makes it difficult for the system to be worldwide spread, and therefore it will be necessary to have transaction servers in each country. On the other hand, due to the fact that the system needs to take control of the mobile handset, and this control depends on the different mobile phone brands and models, and since that control is not standardised, it will be necessary to have different modules for each different mobile phone, and also for each new model, which will make it even less universal. Moreover, the user will be forced to learn new instructions every time he uses a different model. A connection via the WAP protocol, which allows a greater standardisation, would make the process a lot more expensive for the user, due to the large quantity of data required in the connections using this method. On the other hand, the limited keypad of the mobile phone affects the introduction of the required alphanumeric data, in a WAP connection, what makes the transaction process slower, in case of using the mobile handset as a phone for purchasing/selling. Finally, the own conception of the system requires the presence and use of POS terminals in the shops.

SUMMARY OF THE INVENTION

The present invention can be framed in the technical sector of telecommunications and is about a valid method for terminals based on programmable mobile handsets with a connection to Internet, for charge and payment transactions, in which the use of up to 5 elements of verification of the user by the system, makes such transactions safe. The 5 elements used by the system to identify the user can be: 1) the debit/credit card data, or debit bank account; 2) the user's mobile telephone number; 3) the user's personal identification number (NIP); 4) the user's SIM card information that the mobile handset sends as identifier when it connects to internet, currently through HTTP headers, information that can be read by the transactions server; and 5) an access key (CA) that the applications server assigns to the new user, being this access key saved in the mobile telephone memory.

Also, the use of a specific application downloaded into the handset allows that the introduction and sending of data, the authorisation of the transaction and its verification by the user be made in only one connection and in a simple way, which makes the system more flexible. The universality of the application, furthermore allows the system to be used with any mobile telephone without having to make any changes, in any country and using any mobile phone operator with a service access to Internet. Also, the use of a specific application and the robustness and safety of the system allows the seller to receive payments without any card reading devices or any other auxiliary elements being used, other than his own mobile phone. On the other hand, the buyer does not need to have his mobile phone when he is purchasing, since the seller's mobile phone can be used to process the entire transaction.

The system to which the method is applied consists of a transactions server and several programmable mobile handsets, to which an application (eg. written in Java) has been previously downloaded. The purchasing application is designed to make payments, being mainly used in virtual shopping transactions (for example, payments in virtual shops or vending machines). In this case, in a preferred execution of the invention, the user initiates the application and enters the amount to be paid, the personal identification number (NIP), the salesman's telephone number (shown in the vending machine, or in the virtual or real shop) and the shopping reference number if any, and sends them to the transactions server. Previously the transactions server generates a encryption session key different for each connection. The application, which has been downloaded to the mobile phone, encrypts the generated session key with the fixed encryption key assigned to the user in the registry process, generating this way a modified session key, adds the user's own phone number and the access key (CA) to the data which has already been entered by the user, both taken from the mobile telephone's memory and sends them encrypted with the modified session key to the transaction server.

The transactions server will receive the encrypted data, it will encrypt the session key previously generated with the fixed encryption key and with this modified key it will de-encrypt said data. Another option would be to use the SSL protocol, in which case it would not be necessary to generate encryption keys for each user, being such encryption/de-encryption process automatically done by the system.

Once the operation is validated, by checking the user's identity, credit availability and the existence of a valid reference for this transaction, if any, the user will receive a message of acceptance.

The selling application is designed to make charges. In this case is the seller who initiates the application. In a preferred execution of the invention the seller enters the amount to be charged and optionally the sales reference number (RV) and asks the customer to enter the phone number assigned to the transaction system and his personal identification number. The transactions server will send then the session encryption key. Said key is then encrypted by the application downloaded into the mobile phone, with the fixed encryption key, generating this way a modified session key. Finally these data, except the buyer's phone number that is sent without being encrypted, in addition to the seller's phone number and the access key (CA), recovered by the application from the phone's memory, are encrypted with the modified session key and sent to the transactions server. The server will recover the fixed encryption key corresponding to the buyer by means of his mobile telephone number, will encrypt the original session key using that fixed key, generating the modified session key and will de-encrypt the received data using said modified key. SSL o SSH protocols could be also applied in this case.

Once the operation is validated by the transactions server, both mobile handsets, the seller's and the buyer's, will receive each one a message of the operation acceptance.

In a preferred embodiment of the invention, in both applications, the purchasing one and the selling one, the transactions server receives the information, reads the HTTP headers content (in these headers each SIM card is identified), and de-encrypts the received data as previously explained (except the buyer's phone number in the case of a sales transaction) using all that information to identify the users implicated in the transaction, and finally carries out the transaction or denies it. The operation, once validated, will consist of a money transfer between the user's account and the seller's account, both identified by the HTTP headers generated by the mobile telephone for each SIM card, or by their mobile phone numbers or by both at the same time.

In case of not using the HTTP headers in the user's identification process, the user's mobile phone numbers, in purchase mode as well as in sales mode, will be sent without encryption. Both applications (purchasing and selling), can be included, for economy and uniformity reasons, in one application, which can be configured by the user in order to operate in one of these modes.

The user's registration in the system, without exclusion of a on-site mean, can be done by means of the user's access to a web page in the transactions server, where the personal, credit cards and/or other banking accounts data are entered, being that registration identified by means of a registration reference. This registration is verified later, in a preferred execution of the invention, by means of the delivery of a short message SMS by the user (in case of using the mobile telephone number as identifier) and a HTTP connection to said server, which must include said registration reference in the communication. The transactions server extracts the mobile telephone number and HTTP headers and after validating all the cards or banking accounts data, stores all this information in its data base, for the later identification of the user who is registering.

In order to improve the above mentioned systems, a new method has been devised to make charge/payment transactions using a mobile handset, with the following features:

1. The handsets that make the purchasing/selling transactions are the users' own mobile phones. The mobile phones are programmable and must be downloaded with a specific application (e.g. written in Java), downloaded by the user from an applications server, or from another type of data storage, like for example a computer equipped with disks readers; or must be pre-loaded with the application by the manufacturer of the phone.
2. Security: The systems' security is achieved due to the complete user's verification, using up to 5 outstanding elements (ES) of non related information, or of difficult relation, as a) personal data and credit/debit card information, or other financial accounts data, b) the personal identification number (NIP), c) the mobile phone number, d) the HTTP headers of the SIM card information, sent by the mobile handsets, and e) an access key (CA), assigned to each user by the transactions server and stored in the mobile phone's memory when it downloads the application, or in the later configuration.
3. Flexibility: the system's flexibility is due to the fact that all the data to be entered in a transaction can be numeric, which allows a comfortable introduction using the mobile phone keypad.
4. Universality: This is due to the use of a specific application in the mobile phone, which allows the mobile phone to be used as a transactions terminal for purchasing/selling in any country and using any mobile phone operator.
5. Cost: The transactions cost for the user or for the transactions server administrator company is minimum, since once the application is downloaded to the mobile phone, it allows an optimum data flow between the mobile handset and the transactions server.

The scope and contents of the present invention and embodiments thereof will be shown with more clarity by way of example only and with reference to the accompanying drawings.

DETAILED DESCRIPTION OF THE PREFERRED EMBODIMENT

Figure 1:
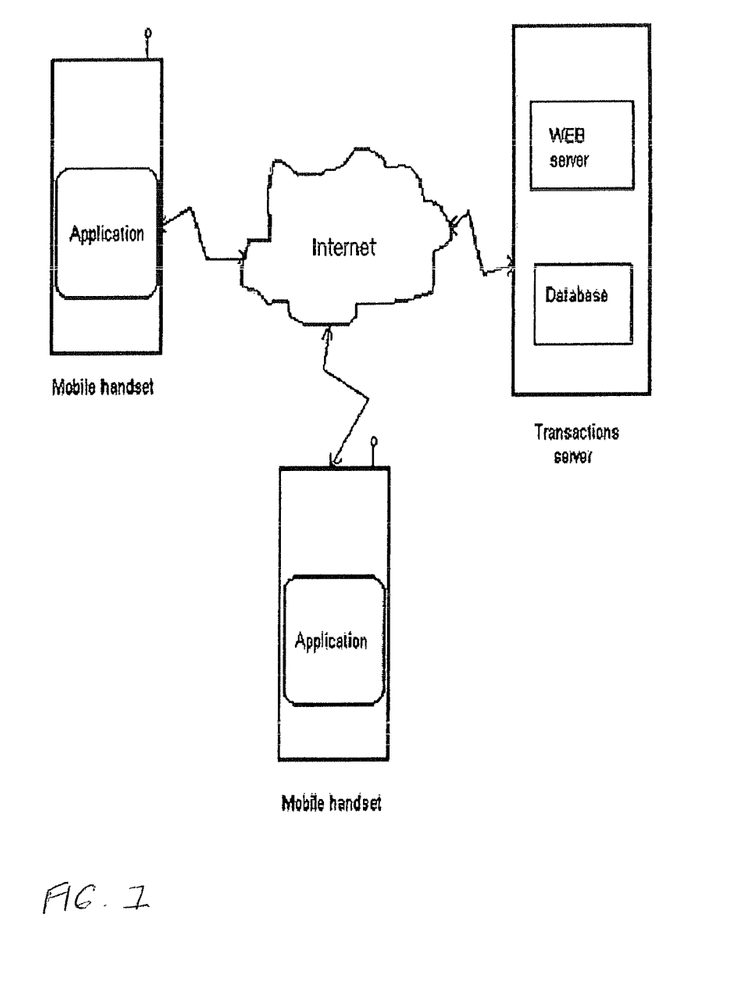
FIG. 1 shows a preferred execution of the patent to make purchasing/selling transactions.

In the FIG. 1 can be seen several mobile phones loaded with the application, which allows them to transmit the user's identification data to the transactions server, for this to verify and validate the transactions. Also, the application will allow them to receive and visualize the results of the last transactions made.

Figure 2:
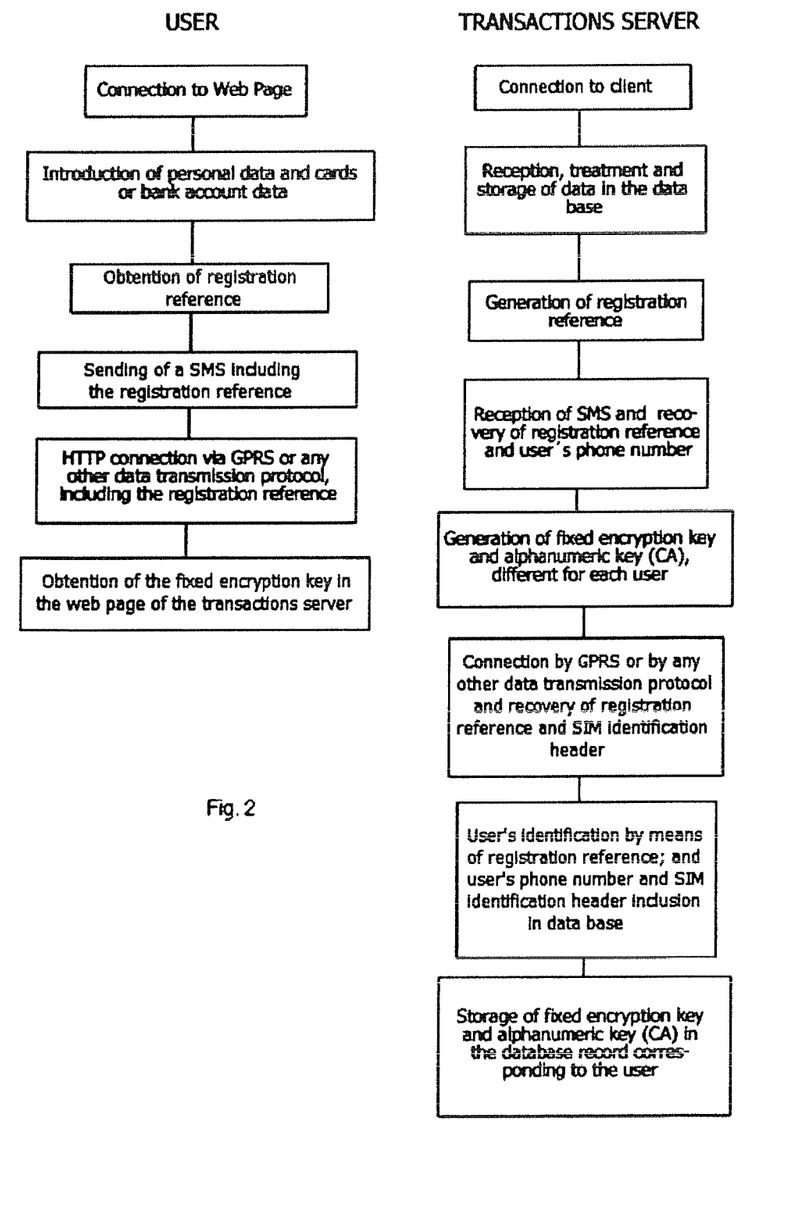
FIG. 2 shows a preferred execution of the user registration process in the system.
Figure 3:
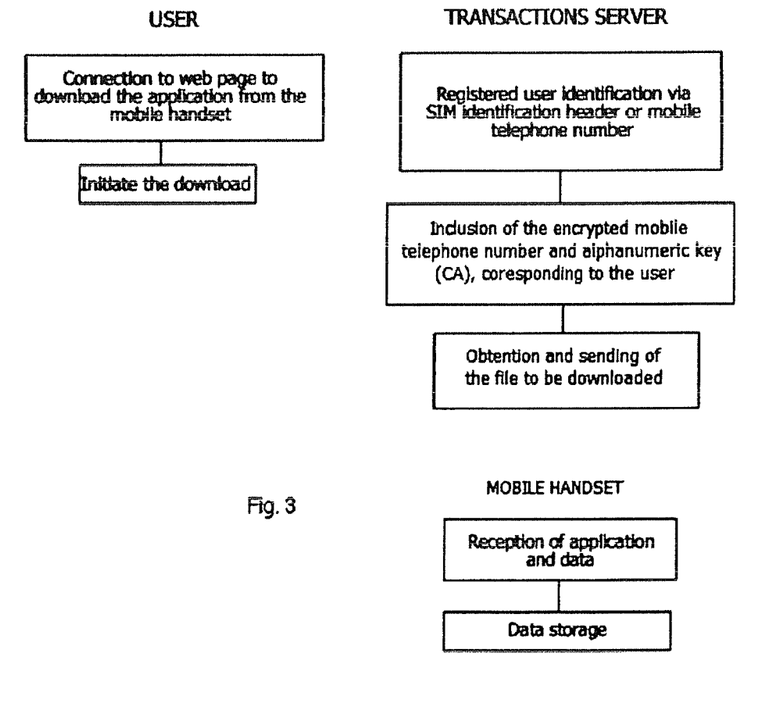
FIG. 3 shows a preferred execution of the download process of the application into the mobile handset.

In order for the system to be able to be used, it will be necessary for the user to register on it. In FIG. 2 can be seen how the user starts the registration process on the transactions server. This registration, as it can be seen in the preferred execution, can be carried out on a web page designed for that purpose, and it involves the introduction of the personal identification data and the credit/debit card or financial accounts information. The system generates a registration reference. Later, the user sends a SMS (short message) to the transactions server, including said registration reference. The server reads the SMS and takes the mobile phone number and the registration reference, adding said phone number to the user's data that have already been entered and that are identified by said registration reference. The use of the telephone number strengthens the security, and also simplifies the user identification, who will not need to memorise unnecessary and complex information. Finally, the user, by using a mobile phone with the same SIM card with which he has sent the previous SMS, makes an HTTP connection to a URL on the server, sending the registration reference with this connection. The transactions server reads the HTTP header, specific to the identification of the user's SIM card and finally stores said header along with the user's data already entered, identified by the registration reference as previously sent by means of the SMS (short message). In the same process, the server generates a fixed encryption key, associated to each user, stores it in the database, in the record associated to each user, and then shows it to the user by means of the registration web page, which will be downloaded on the user's computer system using a safe protocol. The user must copy said encryption key in his mobile phone using the keypad in order to configure the application. This encryption key could be also automatically loaded on the mobile phone in the configuration process, using a safe protocol like SSL. Finally, the transactions server will generate an access key (CA) different for each user and will store it as well in the database record. Once this process is finished, the user can download the application into his mobile phone, as it can be seen in FIG. 3, simply by getting into a server URL address and initiating the download. The transactions server will read the mobile phone number and the access key (CA) associated to the user, will encrypt both data with the fixed encryption key and will add them to the file to be downloaded, together with the actual application. Finally, the file will be downloaded to the mobile phone. The information attached to the application is automatically stored in the mobile telephone's memory so it can be used later. Those data will be de-encrypted and re-stored by the application when the user configures and stores the fixed encryption key into the phone. The load of the mobile phone number and the alphanumeric key (CA) could be done manually, using the mobile phone's keypad or remotely by means of a later safe internet connection (for example using the SSL protocol), or using whatever other type of electronic communication in the configuration process.

Figure 4:
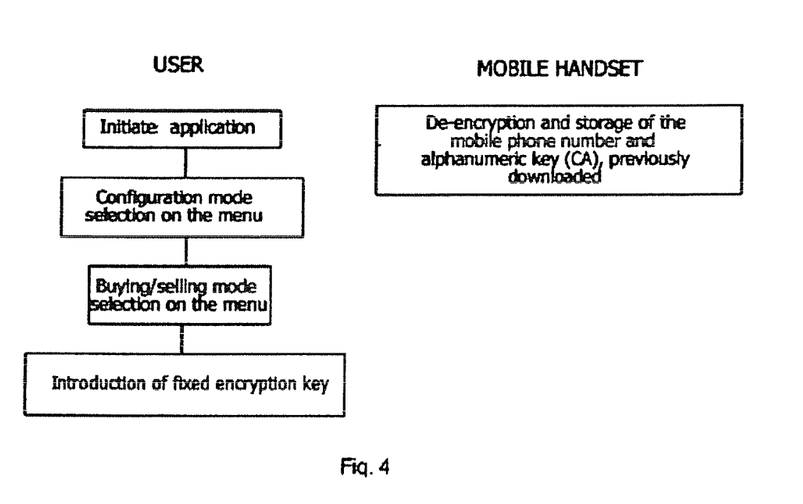
FIG. 4 shows a preferred execution of the configuration process of the application, which has been downloaded to the mobile handset.

Once the application has been installed, the user can initiate it and can accede to the menu, in which there are several options. The following are amongst them: (1) configuration, (2) purchase, (3) sale, (4) transactions verification. Initially, only the configuration option is enabled. In the FIG. 4 it can be seen how the application allows you to configure the mobile handset in either the PURCHASING or the SELLING mode. Once the application has been configured, the PURCHASE (2) or the SALE (3) options and the transactions verification option (4) will be enabled and the mobile phone will be ready to make transactions.

To initiate a purchasing transaction, the user will need to initiate the configured application and select the PURCHASING mode (2) in the menu.

Figure 5:
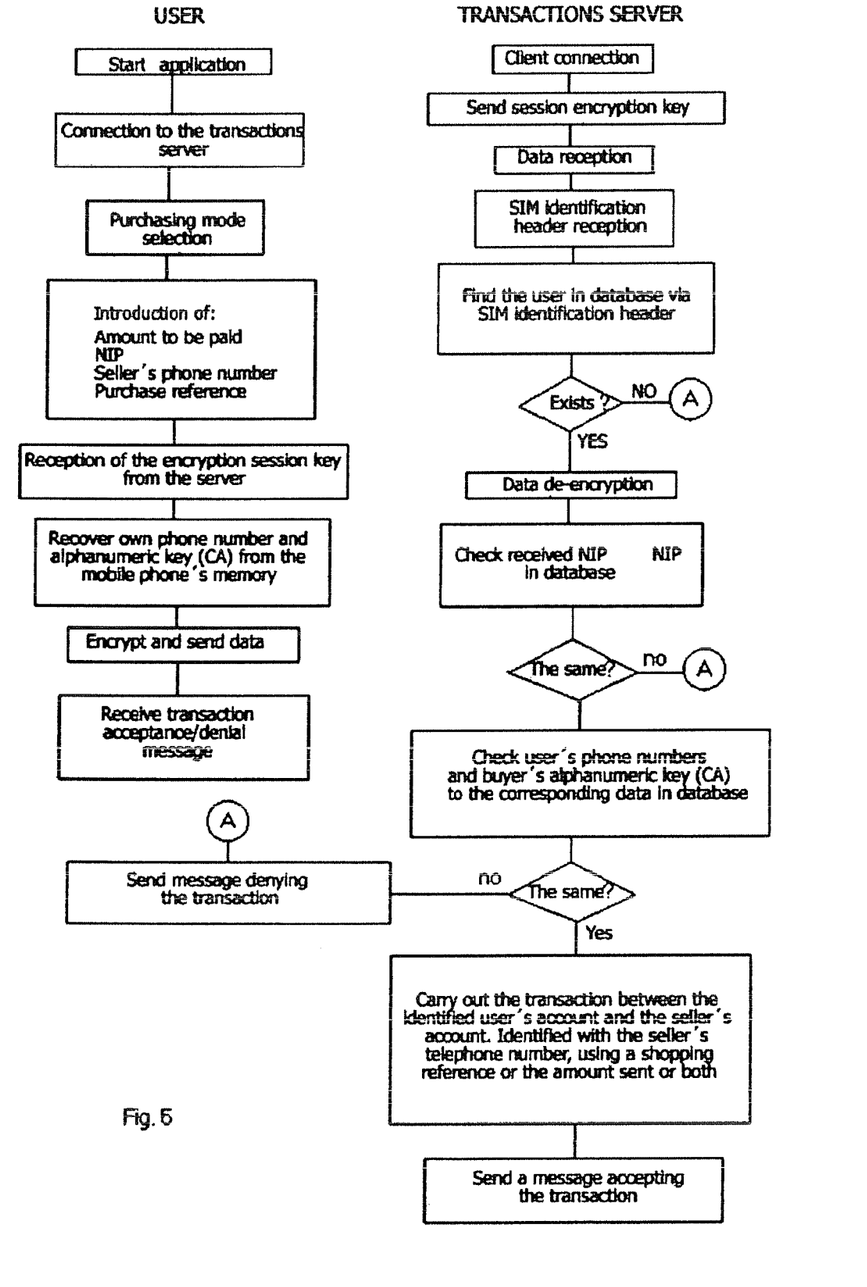
FIG. 5 shows a preferred execution of a purchasing transaction.

As it can be seen in FIG. 5, when you choose this mode, the application shows 3 empty fields in which the user must introduce the amount to be paid, the personal identification number and the merchant's telephone number. The application will interrogate then to the user if there is a purchase reference (RC) in the transaction. If the answer is affirmative, a fourth empty field will appear, where the user will enter this purchase reference (RC), assigned by the merchant.

After the connection, the mobile phone will send to the server the telephone number corresponding to the buyer, recovered from the phone memory. Then the transactions server will generate and send to the mobile phone a session encryption key, encrypted by means of the fixed encryption key corresponding to the buyer, determined by means of the telephone number previously sent too, if this one exists in the data base. In other case, the transaction would be finalized, being a message sent to the user by means of the still opened connection. Said key will be received and de-encrypted by the application using the fixed encryption key stored in the phone memory, obtaining then the real session key, which will be known by both, mobile phone and server. Once entered, the data corresponding to the transaction, along with the access key (CA) and the own mobile telephone number, recovered from the phone memory, are encrypted by the application with that session key and sent through GPRS, UMTS or any other cellular protocol for data transmission, to the transactions server over Internet. In FIG. 5 it can be seen how the server receives those encrypted data, as well as the SIM card HTTP identification headers. Once the data have been received, the transactions server gains access to the associated database, where it carries out the search for the record being identified by the corresponding HTTP header, or by the user's own telephone number (TEL), which is sent without being encrypted. If such record does not exist, the transaction will be finished, and a message will be sent to the user in that sense, using the connection which is still open. If the record exists, the received information will be de-encrypted, using said session encryption key, ant the personal identification number (NIP) will be compared to the one in the data base. If they do not match, the transaction will be finished, and a failure message will be sent to the user through the open connection. If they coincide, the sent phone number and the access key (CA) will be next compared to the existing ones in the data base. If one of the matches fails, the transaction will finish, sending to the user the corresponding warning message. If all the data match, the transaction will be considered correct. In this case, the transfer of funds will be carried out from the account associated to the referred user in the identified record to the account that belongs to the user who is referenced by the seller's mobile phone number, number previously introduced by the buyer and sent by the mobile handset, and either corresponding to the purchase introduced in the optional purchase reference field (RC), which was also sent previously from the mobile handset, or quantified by the amount field of the transaction, sent as well from the mobile handset. Once the transfer has been carried out, the transaction will be considered complete, and a confirmation message, encrypted using the session key, will be sent to the user, using the same connection, which is still open. This message will show the most relevant information of the transaction. The transactions server will keep a record of all the transactions made by the system, whether they are correct or incorrect. The SSL protocol could be used in this case in a similar way.

Figure 6A:
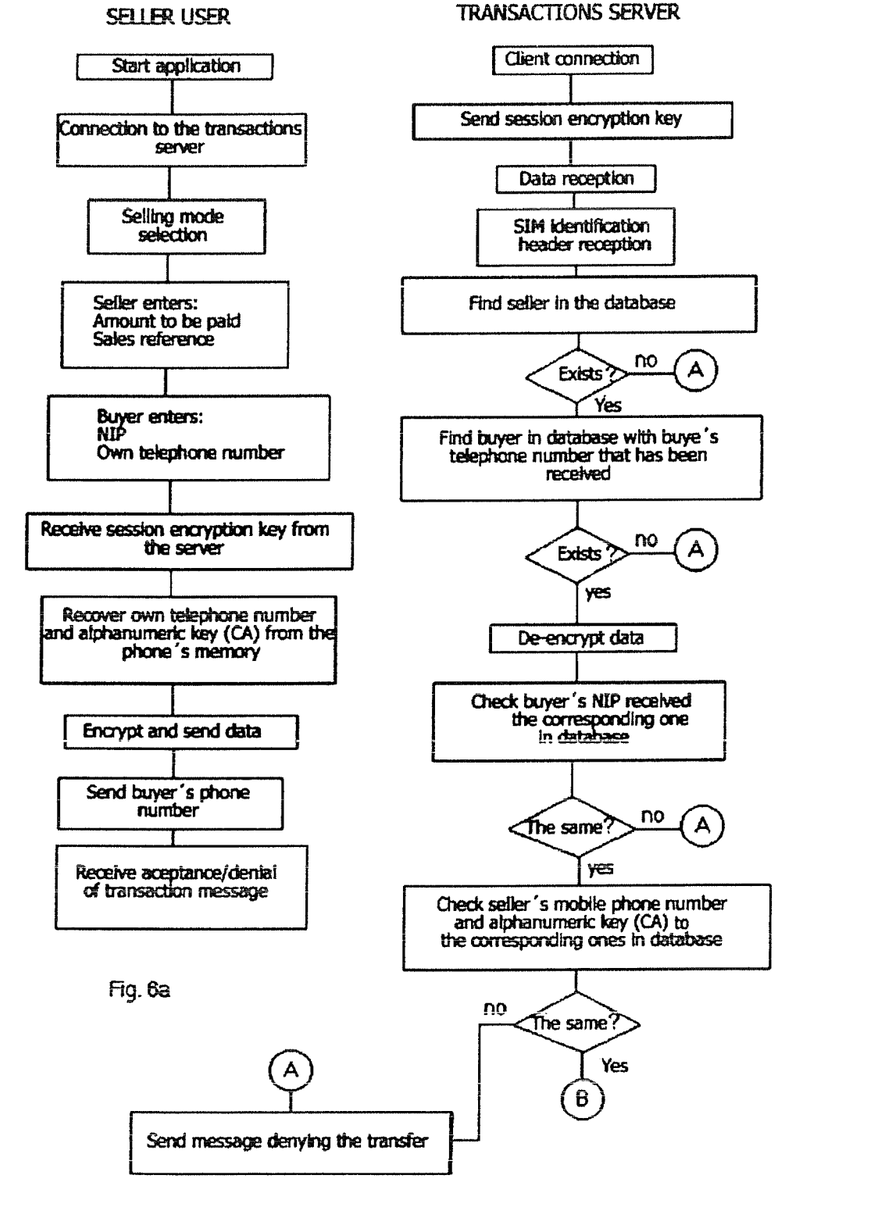
FIGS. 6a and 6b show a preferred execution of a selling transaction.
Figure 6B:
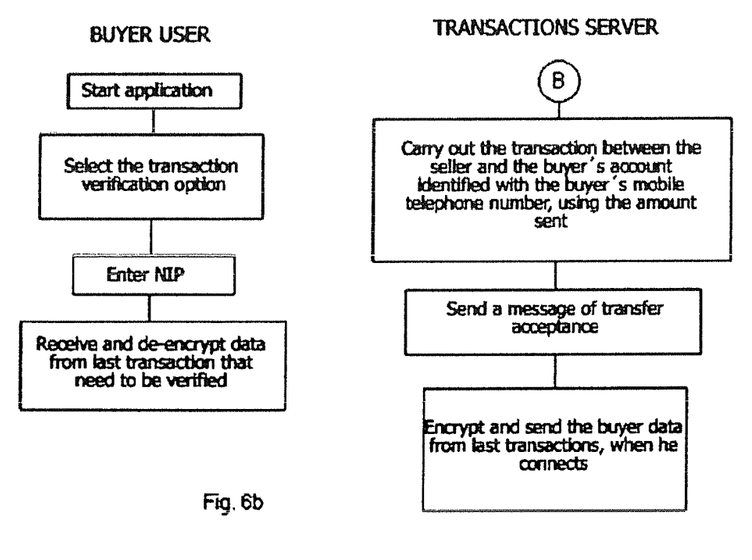

FIGS. 6a and 6b show a process followed for carrying out a selling transaction. In this case, the seller must initiate the application and select the SELLING mode (3) on the menu. After doing this, he will get a screen with four fields, corresponding to the transaction amount, the sales reference (RV), the buyer's phone number and his personal identification number (NIP). The first two must be filled up by the merchant, although the sales reference field (RV) is optional. Once this information is entered, the merchant requests to the buyer to enter his mobile phone number and his personal identification number, and the data introduction finishes. Finally the application will recover the merchant's phone number and the access key (CA) from the phone memory. The application connects then to the transactions server through a GPRS or UMTS connection, or through any other cellular data transmission protocol, and sends the phone number corresponding to the seller. Then the transactions server sends a session encryption key, encrypted as well with the fixed encryption key corresponding to the seller, if he exists in the data base. The application receives and de-encrypts the session key by means of the fixed encryption key, stored in the phone memory, session key that will be known therefore by both mobile phone and server. Then it encrypts the previous data of the transaction using said session key and sends them to the server. All the data are encrypted, except the seller's mobile phone number, in its case, that is sent without encryption. Then the transactions server receives certain seller's and buyer's encrypted information, the seller's telephone number, as well as the SIM card identification HTTP headers. Like in the purchase transaction, the transactions server de-encrypts the information using the session key and checks if the record referenced by the corresponding HTTP header (or by the seller's own telephone number, in its case), as well as the buyer's record, referenced by his telephone number, exist in the database. If one of these records does not exist, that transaction finishes, sending an error message to the seller's handset, via the connection still open. If the buyer's personal identification number, once de-encrypted, does not match to the NIP which is associated to the buyer's record through his mobile phone number sent in the connection, the transaction finishes, and again an error message is sent to the seller's mobile handset. If both NIPs match, the seller's mobile telephone number associated to the identification HTTP header and the key access (CA) will be read from the database. If this information matches to the one which has been recently de-encrypted, belonging to the seller, the transaction is considered correct and the funds transfer, between the buyer's account, referenced by his mobile telephone number, and the merchant's account, referenced by the corresponding HTTP header (or by his mobile telephone number), is carried out. The transactions server keeps a record of all the transactions made whether they are valid or not, including the sales reference (RV), attached if it has been entered by the seller in his mobile handset. A confirmation message will be sent to the seller's mobile handset, using the still open connection, previously encrypted with the session key. As shown in FIG. 6b, in the event that the buyer later on wants to know the last transaction result, he must use option (4) in his transaction menu. Once this option is selected, he must enter his personal identification number (NIP) and initiate the request to the transactions server. The application will send the buyer's mobile own phone number. The transactions server will receive the SIM card identification HTTP header, or in other case, the buyer's mobile telephone number, will read the record associated to this user from the database, will generate and send to the mobile handset the encryption session key, encrypted said key with the fixed encryption key associated to the buyer and will send the confirmation message encrypted with said session key. The server will encrypt and send also the NIP corresponding to the user. The application will de-encrypt the session key with the fixed encryption key, stored in the mobile phone memory, obtaining the session key, will de-encrypt the confirmation message using said session key, will de-encrypt as well the NIP sent, will check it to the NIP previously introduced and if both match, will show the confirmation message in the mobile phone's screen. In this case the SSL safe protocol could be used in the same way.

The system could be provided with greater security, by blocking the user's record when three wrong connections with the same identification HTTP header (or the same telephone number) are made.

Naturally, the invention is not limited to the above executions, described and shown in the figures, since it can be modified within the scope of the attached claims.

The invention claimed is:

1. A method for conducting a financial transaction on a mobile device of a user in conjunction with a server operably coupled to the mobile device over a mobile communication network with the server accessing a database, the method comprising:
1) performing a registration process by a server, wherein the registration process includes:
storing in the database a phone number of the mobile device and user personal information, wherein the user personal information includes financial account data identifying a financial account of the user,
generating an access key and a user encryption key for the user, and
storing the access key and user encryption key for the user in the database as part of the user personal information;
2) sending by the server the access key, the user encryption key and a software application to the mobile device;
3) storing by the mobile device the software application along with the user encryption key and the user access key of the user in memory of the mobile device;
4) communicating by the server an encrypted session key to the mobile device, wherein the encrypted session key is encrypted using the user encryption key;
5) executing by the mobile device the software application stored in the memory of the mobile device, wherein the execution includes:
generating user transaction data for the financial transaction,
decrypting the encrypted session key using the user encryption key stored in the memory of the mobile device,
encrypting the user transaction data and the user access key stored in the memory of the mobile device in an encrypted form using the decrypted session key, and
communicating data from the mobile device to the server, wherein such data includes the encrypted transaction data and the encrypted user access key as well as the phone number of the mobile device in non-encrypted form; and
6) receiving and processing by the server the encrypted transaction data and the encrypted user access key communicated from the mobile device, wherein the processing includes:
identifying the user personal information of the user from the database based on the received phone number in non-encrypted form,
decrypting the received transaction data and the user access key by using the session key,
comparing the decrypted user access key with the stored user access key that is part of the user personal information,
determining the decrypted user access key matches with the stored access key,
based on the determination that the decrypted user access key matches with the stored access key, identifying the financial account data that is part of the user personal information, and
carrying out a transfer of funds from or into the financial account of the user based on the identified financial account data.

2. A method according to claim 1, further comprising:
prior to 4), communicating by the mobile device the phone number of the mobile device to the server; and
generating by the server the session key and encrypting the session key using the user encryption key determined from the phone number of the mobile device.

3. A method according to claim 1, wherein:

the user personal information stored in the database includes personal identification data assigned to the user, the software application is configured to request user entry of the personal identification data into the mobile device during the financial transaction, and the transaction data sent in encrypted form from the mobile device to the server includes the personal identification data entered by the user into the mobile device.

4. A method according to claim 3, wherein:

the server is configured to utilize the session key to decrypt and recover the personal information data entered by the user and sent from the mobile device to the server in encrypted form, and compares the recovered personal information data entered by the user with the personal information data stored in the database to determine whether the recovered personal information data matches the stored personal information data.

5. A method according to claim 1, wherein:

at least one of said plurality of financial transactions is a purchase, wherein said server initiates a transaction that transfers funds between the financial account of the user of the mobile device and a seller account.

6. A method according to claim 1, wherein:

at least one of said plurality of financial transactions is a sale, wherein said server initiates a transaction that transfers funds between the financial account of the user of the mobile device and a buyer account.

7. A system for conducting a financial transaction through a mobile communication network, comprising:

a mobile device operated by a user, the mobile device including memory; and a server operably coupled to the mobile device of the user over the mobile communication network, the server accessing a database;

wherein the server and the mobile device are programmed to carry out a sequence of operations to conduct the financial transaction that includes 1) the server performing a registration process, wherein the registration process includes:

storing in the database a phone number of the mobile device and user personal information, wherein the user personal information includes financial account data identifying a financial account of the user, generating an access key and a user encryption key for the user, and storing the access key and user encryption key for the user in the database as part of the user personal information;

2) the server sending the access key, the user encryption key and a software application to the mobile device;

3) the mobile device storing the software application along with the user encryption key and the user access key of the user in the memory of the mobile device;

4) the server communicating an encrypted session key to the mobile device, wherein the encrypted session key is encrypted using the user encryption key of the user;

5) the mobile device executing the software application stored in the memory of the mobile device, wherein the execution includes:

generating user transaction data for the financial transaction, decrypting the encrypted session key using the user encryption key stored in the memory of the mobile device encrypting the transaction data and the user access key stored in the memory of the mobile device in an encrypted form using the decrypted session key, and communicating data from the mobile device to the server, wherein such data includes the encrypted transaction data and the encrypted user access key as well as the phone number of the mobile device in non-encrypted form; and 6) the server receiving and processing the encrypted transaction data and the encrypted user access key communicated from the mobile device, wherein the processing includes:

identifying the user personal information of the user from the database based on the received phone number in non-encrypted form, decrypting the received transaction data and the user access key by using the session key, comparing the decrypted user access key with the stored user access key that is part of the user personal information, determining the decrypted user access key matches with the stored access key, and based on the determination that the decrypted user access key matches with the stored access key, identifying the financial account data that is part of the user personal information, and carrying out a transfer of funds from or into the financial account of the user based on the identified financial account data.

8. A system according to claim 7, further comprising:

prior to 4), the mobile device communicating the phone number of the mobile device to the server; and the server generating the session key and encrypting the session key using the user encryption key determined from the phone number of the mobile device.

9. A system according to claim 7, wherein:

the user personal information stored in the database includes personal identification data assigned to the user, the software application is configured to request user entry of the personal identification data into the mobile device during the financial transaction, and the transaction data sent in encrypted form from the mobile device to the server includes the personal identification data entered by the user into the mobile device.

10. A system according to claim 9, wherein:

the server is configured to utilize the session key to decrypt and recover the personal information data entered by the user and sent from the mobile device to the server in encrypted form, and compares the recovered personal information data entered by the user with the personal information data stored in the database to determine whether the recovered personal information data matches the stored personal information data.

11. A system according to claim 7, wherein:

at least one of said plurality of financial transactions is a purchase, wherein said server initiates a transaction that transfers funds between the financial account of the user of the mobile device and a seller account.

12. A system according to claim 7, wherein:

at least one of said plurality of financial transactions is a sale, wherein said server initiates a transaction that transfers funds between the financial account of the user of the mobile device and a buyer account.

* * * * *